April 7, 1959     E. F. MIDDLETON ET AL     2,880,998
FEED MEANS FOR THERMOPLASTIC SHEETS
Filed Oct. 3, 1956     3 Sheets-Sheet 1
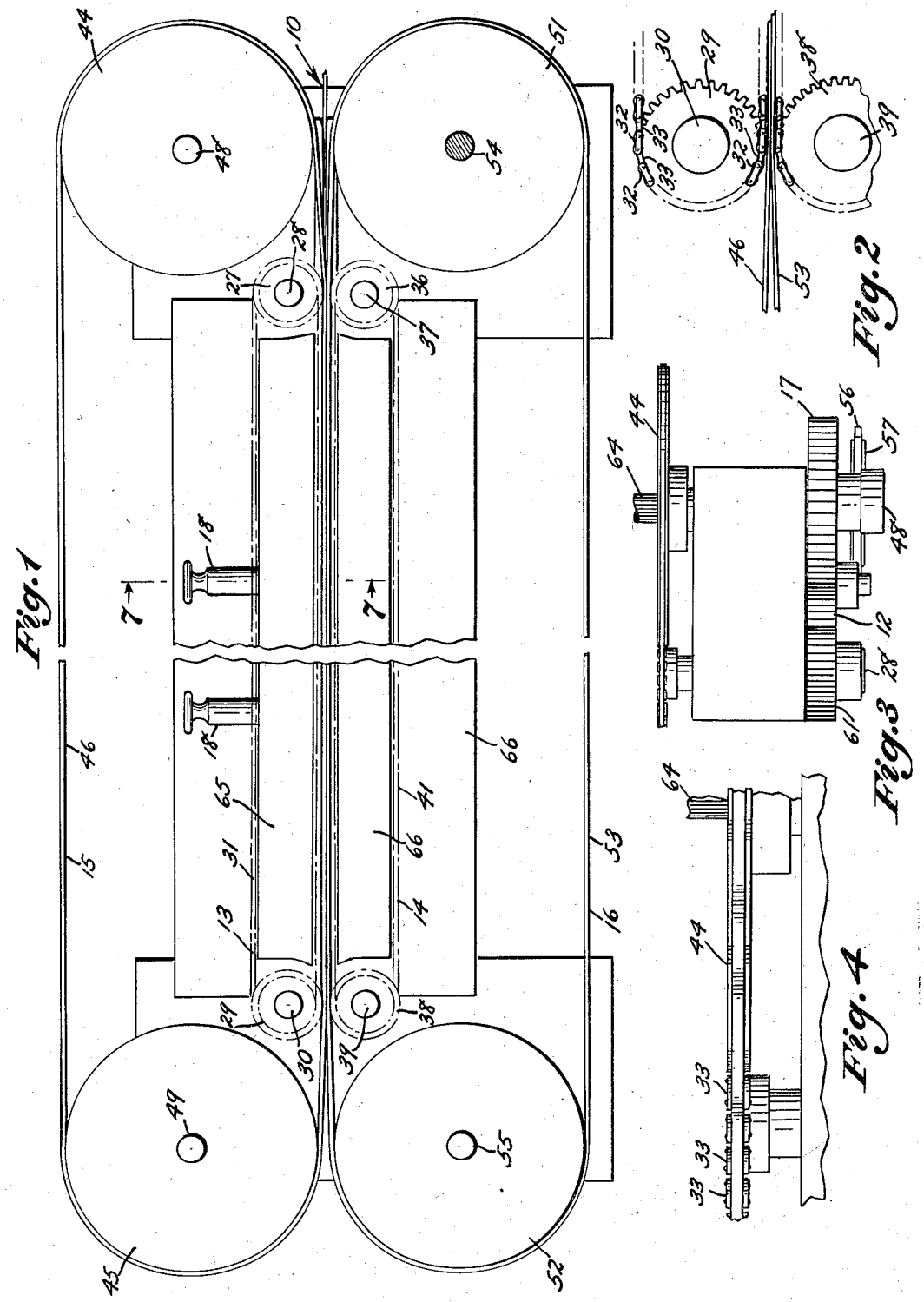

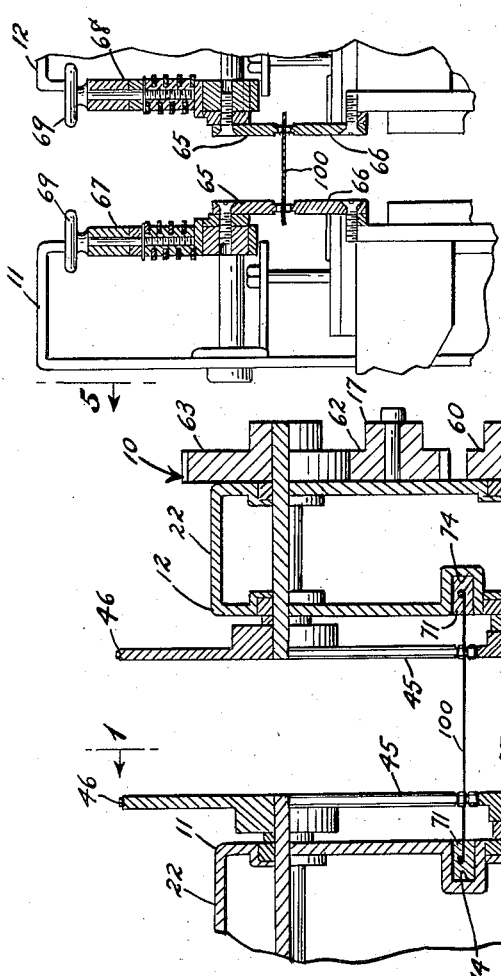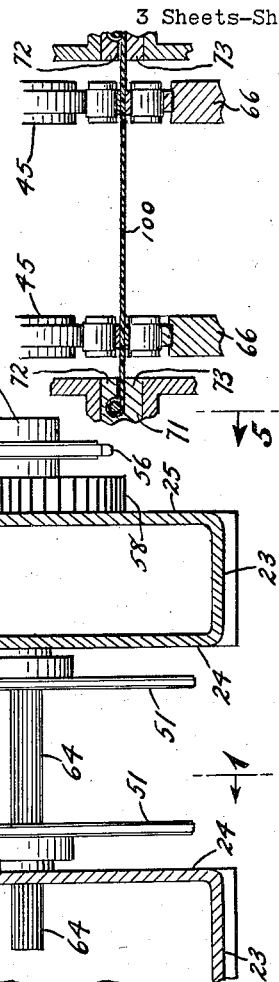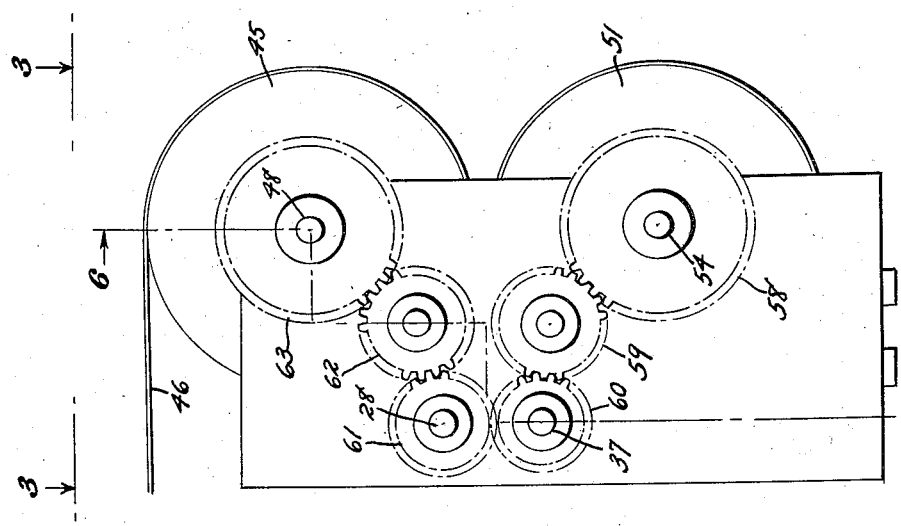

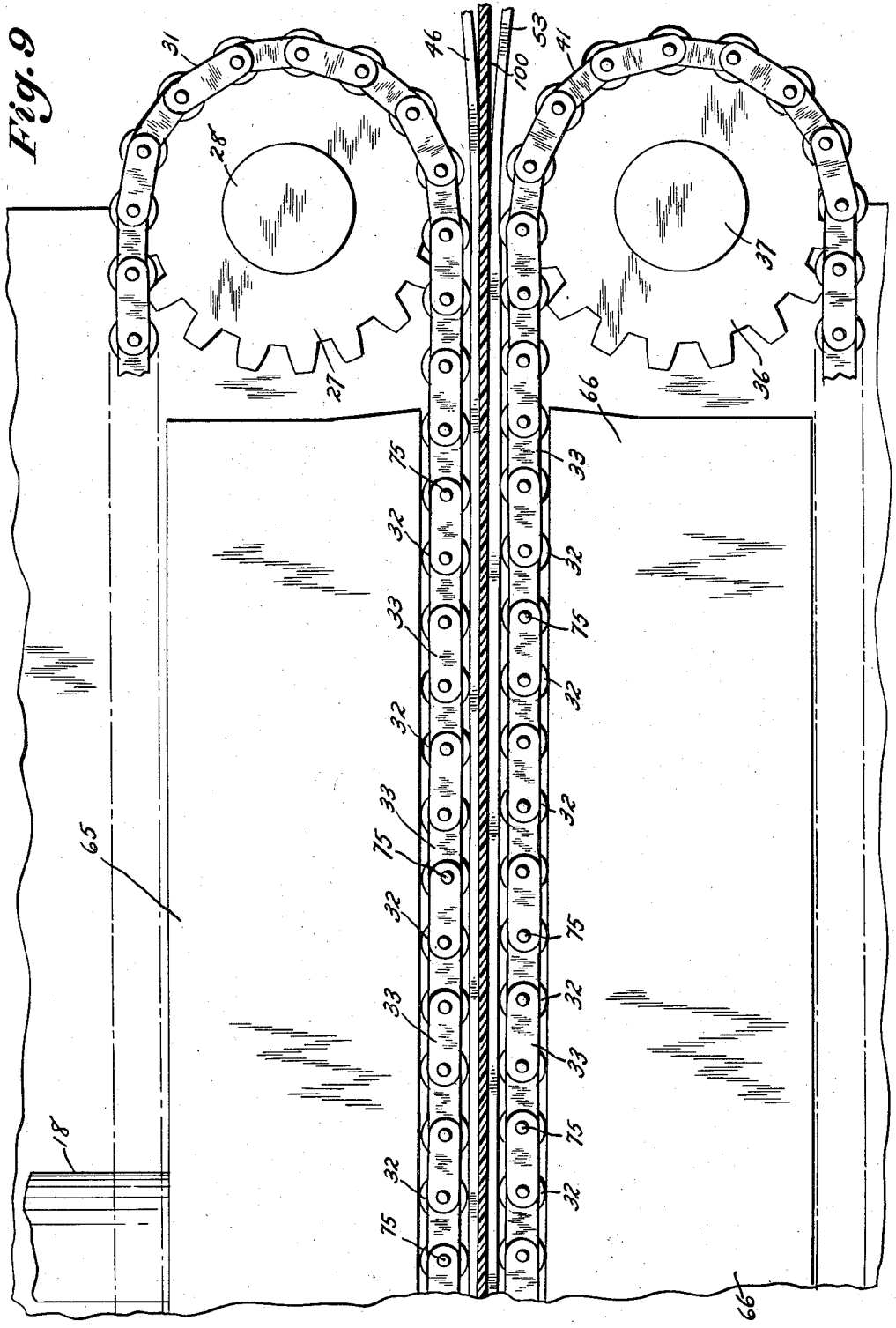

United States Patent Office 2,880,998
Patented Apr. 7, 1959

2,880,998

FEED MEANS FOR THERMOPLASTIC SHEETS

Earl F. Middleton, Pleasantville, and Carl W. Middleton, Larchmont, N.Y.

Application October 3, 1956, Serial No. 613,786

6 Claims. (Cl. 271—45)

This invention relates to the forming of thermoplastic sheets into predetermined shapes, and more particularly to improved means for feeding said sheets into devices employing continuous sheet material to shaping or embossing elements of said devices. Reference is made to U.S. Patent No. 2,559,365 granted July 3, 1951, to Earl F. Middleton et al. as illustrative, the present disclosure being an improvement thereon.

In the device disclosed in the above patent, the material is advanced by means of carrier chains having rubber gripping members which are adapted to resiliently bear upon the upper and lower surfaces of the thermoplastic sheet being treated and thereby advance the sheet as required. This construction, while effective, may under certain conditions tend to mar the surface of the material and thus adversely affect the appearance of the finished product. This is particularly true where materials such as acetate cellulose and others having relatively smooth surfaces are employed. The marring is caused by the excessive friction necessarily existing between the rubber gripping members and the surfaces of the material being advanced. Further, owing to the fact that pressure is applied by means of the individual links of the carrier chain, the frictional forces are greater at some points along the strip of thermoplastic material than at others, and unnecessarily high at points upon which pressure is exerted directly upon the carrier chain.

It is therefore among the principal objects of the present invention to provide carrier chain advancement structure of the type described in which the above mentioned disadvantages have been substantially eliminated.

Another object of the invention lies in the provision of feeding means of the class described in which all resilient rubber engaging members bearing directly upon the surfaces of the thermoplastic material have been eliminated with a corresponding absence of marring or distortion of said surfaces.

Another object of the invention lies in the provision of continuous metal band means for advancing sheet thermoplastic material which is frictionally insulated with respect to other non-moving parts of the device, thereby eliminating excessive wear upon the same with continued usage.

A further object of the invention lies in the provision of structure of the class described in which the cost of fabrication may be of a reasonably low order, thereby permitting consequent wide sale distribution and use.

Still another object herein lies in the provision of sheet advancement means capable of advancing sheets of varying thickness and material, thereby providing for wide utility.

A feature of the invention lies in the fact that the inventive structure may be incorporated into existing machines of the class described without extensive modification.

Another feature of the invention lies in the provision of improved support of the workpiece by distributing the supporting load over a large number of supporting areas.

These objects and features, as well as other incidental ends and advantages, will become more clearly apparent during the course of the following disclosure and be more particularly set forth in the appended claims.

On the drawings, to which reference will be made in the specification, similar reference characters have been employed to designate corresponding parts throughout the several views.

Figure 1 is a fragmentary sectional view in perspective showing an embodiment of the invention, as seen from the plane 1—1 on Figure 6.

Figure 2 is an enlarged fragmentary view corresponding to the central lefthand portion of Figure 1.

Figure 3 is a fragmentary plan view as seen from the plane 3—3 on Figure 5.

Figure 4 is an enlarged fragmentary view in elevation corresponding to the upper portion of Figure 3.

Figure 5 is a fragmentary elevational view as seen from the plane 5—5 on Figure 6 showing means for synchronizing the movement of certain of the moving parts comprising the device.

Figure 6 is a vertical sectional view as seen from the planes 6—6 on Figure 5.

Figure 7 is a fragmentary vertical sectional view as seen from the plane 7—7 on Figure 1.

Figure 8 is an enlarged vertical sectional view corresponding to the central portion of Figure 7.

Figure 9 is an enlarged fragmentary view in elevation corresponding to the central portion of Figure 1.

In accordance with the invention, the device generally indicated by reference character 10, comprises broadly: a first frame element 11, a second frame element 12, a pair of upper carrier chain elements 13, a pair of lower chain elements 14, a pair of upper band elements 15, a pair of lower band elements 16, gear driver means 17 and tensioning means 18.

The frame elements 11 and 12 are generally similar and symmetrical, each including an upper wall 22, a lower wall 23, and inwardly disposed wall 24 and an outwardly disposed wall 25.

The upper chain elements 13 are also similar, one being mounted on each of the frame elements 11 and 12. Each includes a driver sprocket 27, mounted on a shaft 28 for rotation about a substantially horizontal axis. A corresponding driven sprocket 29 is similarly mounted upon a shaft 30. A sprocket chain 31 engages the sprocket 27 and 29, the same including a plurality of pressure transmitting rollers 32 interconnected by connecting links 33.

The lower chain elements 14 are of similar construction and are symmetrically disposed with respect to the corresponding upper chain elements 13. The elements 14 each include a driver sprocket 36 mounted upon a shaft 37, and a driven sprocket 38 mounted upon shaft 39. A chain 41 is engaged by the sprockets 36 and 38 as described above.

The upper band elements 15 are two in number, each including a driver pulley 44 and a driven pulley 45. A thin flexible steel band 46 is engaged by the pulleys 44 and 45, the same being disposed in peripheral grooves 46 as best seen on Figures 1, 5 and 6 of the drawing. The shafts 48 and 49 support the pulleys 44 and 45, respectively for rotation about a horizontal axis.

The lower band elements 16 are also two in number and correspond to the upper band elements 15. Each includes a pair of pulleys 51 and 52 mounted upon shafts 54 and 55, respectively, the pulleys being engaged by a band 53.

The gear driver means 17 includes a pulley 57 engageable by belt means 56 which transmits motion from a prime mover (not shown) which may be in the form of an electric motor. The pulley 57 is mounted upon shaft 54 which in turn drives gear 58 through an idler gear 59 to gear 60 on shaft 37. The gear 60 in turn drives gear 61 on shaft 28, an idler gear 62 and gear 63 on shaft 48. As may be seen on Figure 6 of the drawing, an interconnecting spline 64 transfers motion to the frame element 11, and from a consideration of that figure it will be apparent that all of the means 17 are operated in synchronism. The relationship between the various gears is such that the linear speeds of the bands 46 and 53 will be twice the linear speeds of the chains 31 and 40.

The tensioning means 18 is best seen on Figures 1, 7 and 9 of the drawing, and includes a pair of upper guide bars 65 and a second pair of lower guide bars 66. Tension spring means 67 and 68 are positioned so as to resiliently urge the guide bars 65 downwardly toward the bars 66, the chains 40 and 31 and bands 46 and 53 being positioned therebetween. Adjustment means 69 serves to vary the resilient force applied, depending upon the individual requirements and thickness of the sheet material being used.

Referring to Figure 8 of the drawing, it will be observed that the bands 46 and 53 are adapted to engage the upper and lower surfaces of the sheet material 100 near the peripheral edges thereof whereby die means 71 may be disposed to contact that portion of the sheet 100 disposed outwardly thereof. The specific details of the die means form no part of the present disclosure, and may be of any suitable type, as for example the structure shown. Wherein the shaping operation is performed on parts adjacent the peripheral edges of the sheet, the die means being disposed in the recessed spaces 74 (see Figure 6) as is well known in the art.

Referring to Figure 9 of the drawing, it will be observed that the bands 46 and 53 perform a complete rolling action with respect to the rollers 32 which are carried by the chain links 33 at the points of interconnection. This action occurs owing to the relative velocities of the bands with respect to that of the chains and results in a substantial elimination of friction in these components of the device. The gripping pressure exerted by the bands is transmitted through the rollers 32 by the tensioning means 18 and not through the links 33 which serve merely to position the rollers at evenly spaced intervals along the bands. Thus the pintles 75 interconnecting the links 33 may be of a relatively small cross section, permitting the use of relatively small sized rollers and the shortening of the spacing therebetween. This result permits an increase in the number of rollers 32 along a given length of band, with a consequent improved distribution of the gripping pressure therealong. Increased gripping action is therefore available as required, and the substantial elimination of friction between the bands and the chains is not affected by the increased friction between the bands and the workpiece.

It may thus be seen that we have invented novel and highly useful improvements in thermoplastic sheet feeding means which permits the sheet to be advanced with a minimum of friction and with consequent minimum distortion or abrasion of the exposed surfaces of the material being fed. As the upper and lower surfaces of the sheet material are engaged by the opposed surfaces of thin flexible steel bands only, frictional forces necessary to move the sheet are distributed over a continuous area. The bands themselves are supported only by parts moving at the same linear velocity, so that a minimum of friction occurs between the bands and other parts of the device. This substantial elimination in running friction assures a relatively long, troublefree, useful life of the device, with consequent low maintenance costs and time during which the device is out of service.

We wish it to be understood that we do not consider the invention limited to the precise details of structure shown and set forth in this specification, for obvious modifications will occur to those skilled in the art to which the invention pertains.

We claim:

1. In a device for shaping thermoplastic planar material, improved means for feeding said material to a die or other shaping means comprising: a frame element, upper and lower carrier chain elements mounted upon said frame element for parallel translational movement; said chain elements being so mounted as to present a continuous segment of each chain element to parallel juxtaposed condition; upper and lower band elements mounted upon said frame element for parallel translational movement, said band elements being so mounted as to present a continuous segment of each band element to mutual contact; said segments of said band elements being disposed between said segments of said chain elements; said chain elements having a plurality of links supporting a plurality of roller members at points of interconnection of said links, said roller members being of a diameter sufficient to extend outwardly of said links to engage said band elements.

2. In a device for shaping thermoplastic planar material, improved means for feeding said material to a die or other shaping means comprising: a frame element, upper and lower carrier chain elements mounted upon said frame element for parallel translational movement; said chain elements being so mounted as to present a continuous segment of each chain element to parallel juxtaposed condition; upper and lower band elements mounted upon said frame element for parallel translational movement, said band elements being so mounted as to present a continuous segment of each band element to mutual contact; said segments of said band elements being disposed between said segments of said chain elements; said chain elements having a plurality of links supporting a plurality of roller members at points of interconnection of said links, said roller members being of a diameter sufficient to extend outwardly of said links to engage said band elements; and means for driving said band elements at twice the linear speed of said chain elements.

3. In a device for shaping thermoplastic planar material improved means for feeding said material to a die or other shaping means comprising: a frame element, upper and lower carrier chain elements mounted upon said frame element for parallel translational movement; said chain elements being so mounted as to present a continuous segment of each chain element to parallel juxtaposed condition; upper and lower band elements mounted upon said frame element for parallel translational movement, said band elements being so mounted as to present a continuous segment of each band element to mutual contact; said segments of said band elements being disposed between said segments of said chain elements; means for resiliently urging said segments of said carrier chain elements and said band elements into mutual contact; said chain elements having a plurality of interconnecting links and a plurality of roller members supported at points of interconnection of said links, said roller members being of a diameter sufficient to extend outwardly of said links to engage said band elements and said resilient means.

4. In a device for shaping thermoplastic planar material improved means for feeding said material to a die or other shaping means comprising: a frame element, upper and lower carrier chain elements mounted upon said frame element for parallel translational movement; said chain elements being so mounted as to present a continuous segment of each chain element to parallel juxtaposed condition; upper and lower band elements mounted upon said frame element for parallel translational movement, said band elements being so mounted as to present a continuous segment of each band element to mutual contact; said segments of said band elements being disposed between said segments of said chain elements; means for resiliently urging said segments of said carrier chain elements and said band elements into mutual contact; said chain elements having a plurality of interconnecting links and a plurality of roller members supported at points of interconnection of said links, said roller members being a diameter sufficient to extend outwardly of said links to engage said band elements and said resilient means; and means for driving said band elements at twice the linear speed of said chain elements.

5. In a device for shaping thermoplastic planar material improved means for feeding said material to a die or other shaping means comprising: a frame element, upper and lower carrier chain elements mounted upon said frame element for parallel translational movement; said chain elements being so mounted as to present a continuous segment of each chain element to parallel juxtaposed condition; upper and lower band elements mounted upon said frame element for parallel translational movement, said band elements being so mounted as to present a continuous segment of each band element to mutual contact; said segments of said band elements being disposed between said segments of said chain elements; means for urging the segments of said carrier chain elements and said band elements into mutual contact; said chain elements having a plurality of interconnecting links and a plurality of roller members supported at points of interconnection of said links, said roller members being of a diameter sufficient to extend outwardly of said links to engage said band elements and said last mentioned means.

6. In a device for shaping thermoplastic planar material, improved means for feeding said material to a die or other shaping means comprising: a frame element, upper and lower carrier chain elements mounted upon said frame element for parallel translational movement; said chain elements being so mounted as to present a continuous segment of each chain element to parallel juxtaposed condition; upper and lower band elements mounted upon said frame element for parallel translational movement, said band elements being so mounted as to present a continuous segment of each band element to mutual contact; said segments of said band elements being disposed between said segments of said chain elements; means for urging said segments of said carrier chain elements and said band elements into mutual contact; said chain elements having a plurality of interconnecting links and a plurality of roller members supported at points of interconnection of said links, said roller members being of a diameter sufficient to extend outwardly of said links to engage said band elements and said last mentioned means; and means for driving said band elements at twice the linear speed of said chain elements.

References Cited in the file of this patent

UNITED STATES PATENTS

| | | |
|---|---|---|
| 893,510 | Juengst | July 14, 1908 |
| 2,133,727 | Stande | Oct. 18, 1938 |
| 2,234,116 | Grupe | Mar. 4, 1941 |
| 2,603,484 | Gates | July 15, 1952 |
| 2,703,239 | Curran et al. | Mar. 1, 1955 |
| 2,736,425 | Fisk | Feb. 28, 1956 |